United States Patent [19]

Bauer et al.

[11] Patent Number: 4,908,514
[45] Date of Patent: Mar. 13, 1990

[54] PROCESSING AND TREATING DEVICE FOR X-RAY FILM CASSETTES

[75] Inventors: Walter Bauer; Jürgen Müller, both of Munich; Volkmar Voigtländer, Eichenau, all of Fed. Rep. of Germany

[73] Assignee: Agfa-Gevaert AG, Leverkusen, Fed. Rep. of Germany

[21] Appl. No.: 244,806

[22] Filed: Sep. 14, 1988

[30] Foreign Application Priority Data

Oct. 1, 1987 [DE] Fed. Rep. of Germany ....... 3733191

[51] Int. Cl.$^4$ ............................................. G03B 42/02
[52] U.S. Cl. ............................ 250/327.2; 414/788.7; 414/798.7
[58] Field of Search ............... 250/327.2 D, 327.2 J, 250/484.1 B; 378/173, 172, 182; 414/411, 788.4, 788.7, 798.6, 798.7, 798.9

[56] References Cited

U.S. PATENT DOCUMENTS

| | | | |
|---|---|---|---|
| 3,111,585 | 11/1963 | Sano et al. | 414/411 |
| 3,150,263 | 9/1964 | Catlin | 53/266 R |
| 4,498,005 | 2/1985 | Oono et al. | 250/327.2 |
| 4,566,955 | 1/1986 | Naarmann | 204/59 R |
| 4,601,386 | 7/1986 | Antonello | 198/576 |
| 4,811,546 | 3/1989 | Takashima et al. | 53/266 R |

FOREIGN PATENT DOCUMENTS

| | | |
|---|---|---|
| 0079557 | 11/1982 | European Pat. Off. |
| 0132709 | 7/1984 | European Pat. Off. |
| 1207210 | 12/1965 | Fed. Rep. of Germany |
| 1260081 | 9/1986 | U.S.S.R. ........................ 414/798.9 |

*Primary Examiner*—Constantine Hannaher
*Attorney, Agent, or Firm*—Michael J. Striker

[57] ABSTRACT

A handling device for X-ray film cassettes with a sheet shaped receiving material sensitive to X-rays comprises an input slot for introducing a cassette, a separate output slot for removing a cassette, the input and output slots extending substantially in the vertical direction, a cassette input stack container for accommodating cassettes to be inserted into the input slot and associated with the latter, and a cassette output stack container for receiving cassettes withdrawn from the output slot and associated with the latter, the input stack container having a bottom surface which extends downwardly towards the input slot and a rearwardly inclined rear wall which borders and aligns with the input slot, the input stack container being provided with transporting unit for a first cassette accommodated in a cassette stack and having its end side aligned with the input slot, the output stack container also having a rearwardly inclined rear wall and a downwardly forwardly inclined bottom surface provided with a catching railing for the cassettes.

19 Claims, 5 Drawing Sheets

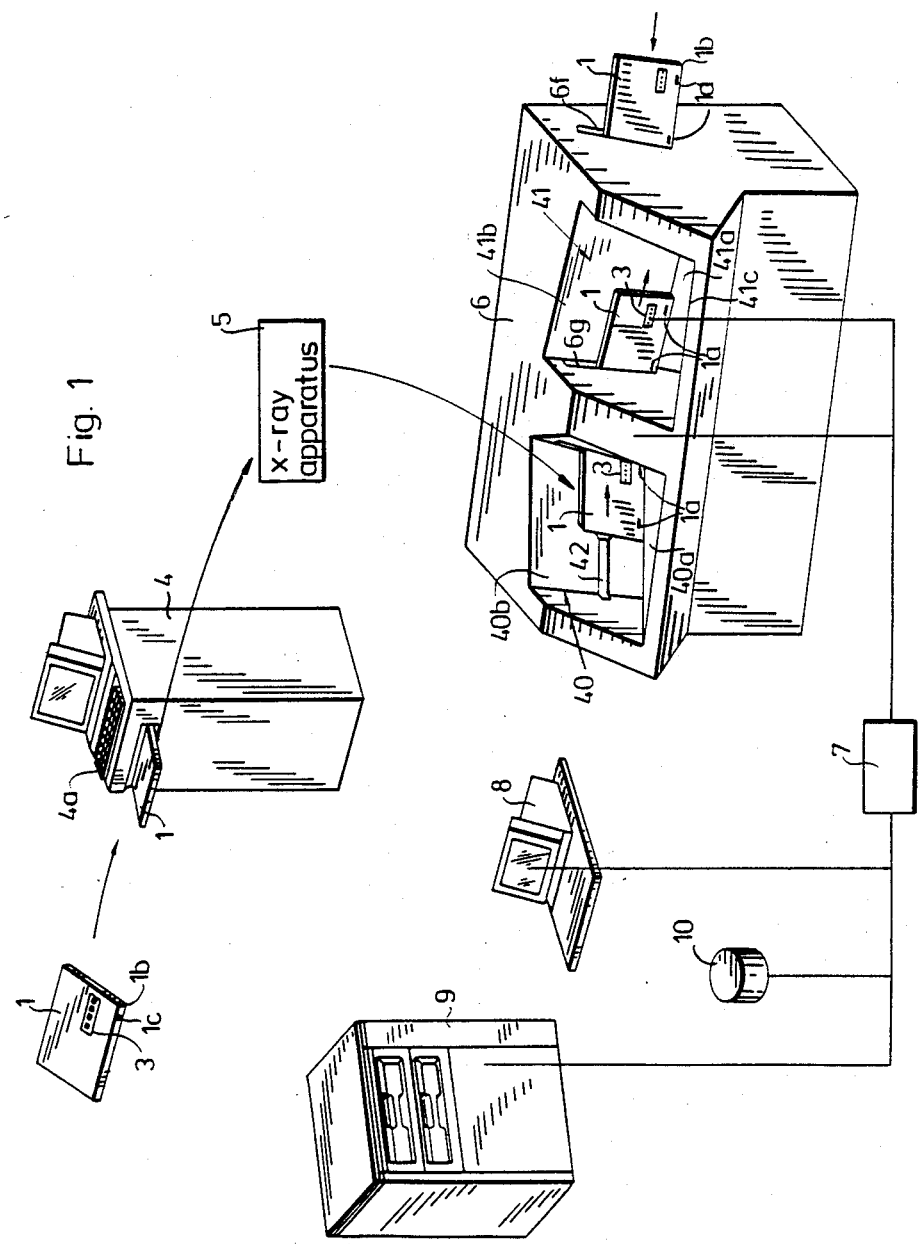

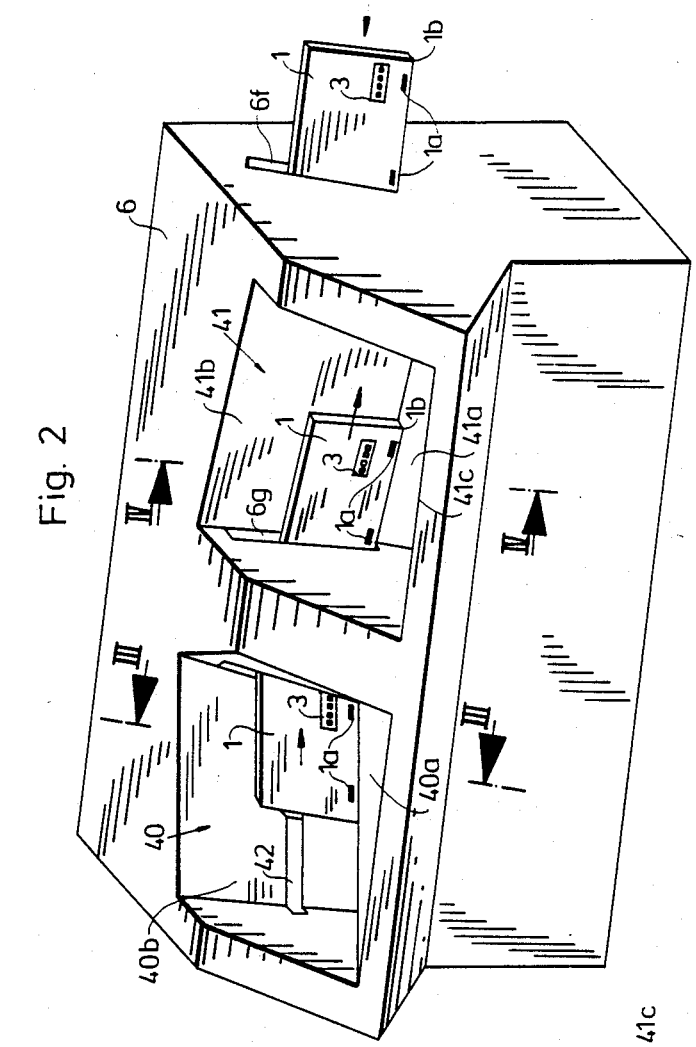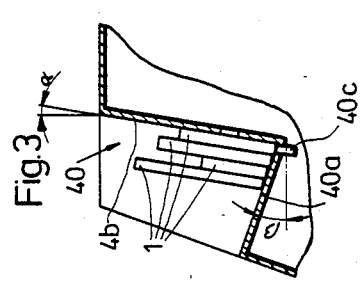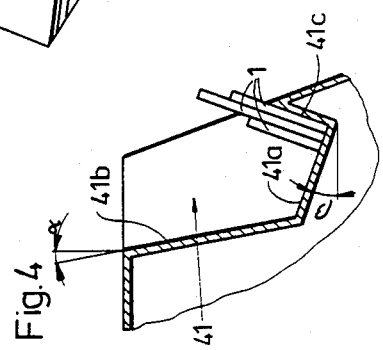

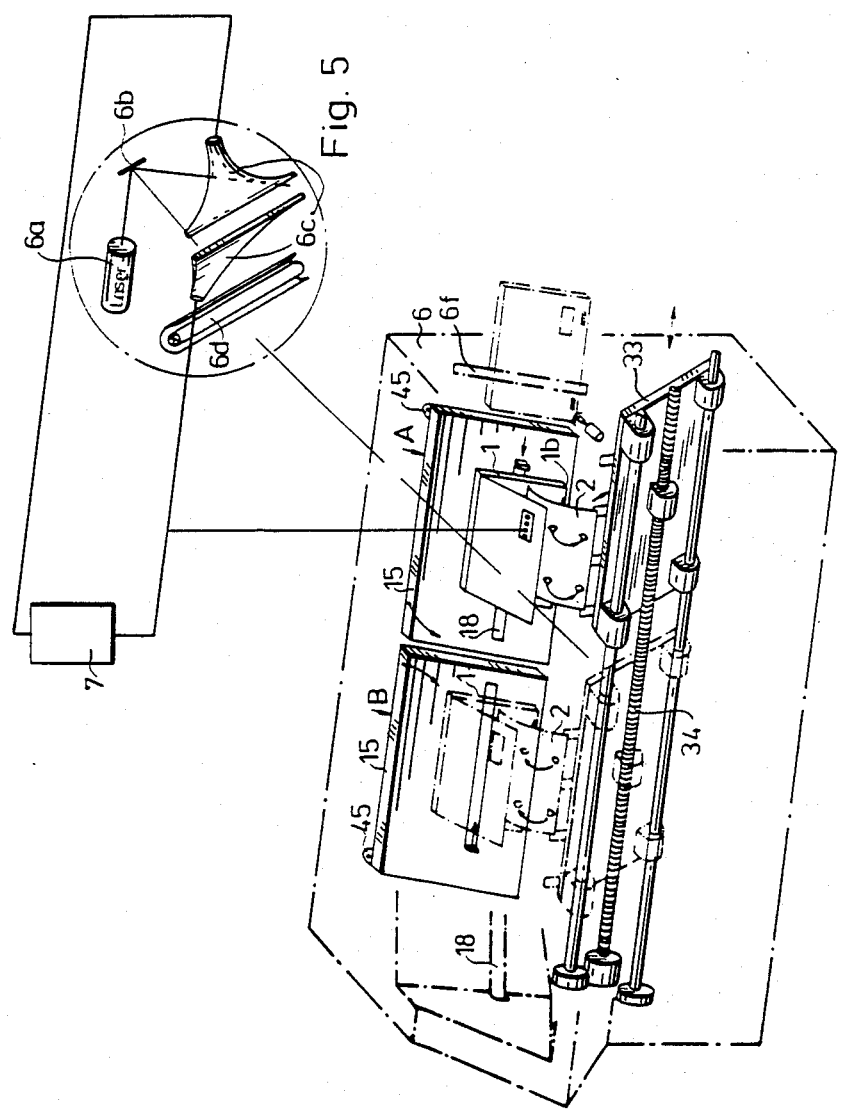

PROCESSING AND TREATING DEVICE FOR X-RAY FILM CASSETTES

BACKGROUND OF THE INVENTION

The present invention relates to a processing or treating (handling) device for X-ray film cassettes with a sheet-shaped receiving (photographing) material which is sensitive to X-rays. More particularly, it relates to such a device which has an inlet slot and a separate outlet slot for the cassettes, and the slots are closeable in a light-tight manner.

Devices of the above-mentioned general type are known in the art. A known processing device is disclosed, for example, in U.S. Pat. No. 3,150,263 and formed as cassette loading and unloading device for cassettes with photographic X-ray image. The cassettes are individually inserted by hand, there is no possibility to draw them automatically from a stack or a magazine into the device. The German document DE-PS 12 07 210 or U.S. Pat. No. 3,111,585 disclose cassette magazines of different constructions, from which the cassettes can be automatically transported into a loading and unloading device. These known arrangements have a plurality of parts and occupy considerable spaces, and also with respect to the arrangement of the cassettes in the magazines or in the waiting position they require considerable operational costs.

The European document EP 0079557 B1 discloses a cassette of the above-mentioned type wherein a foil coated with stimulatable phosphorus is formed on the receiving material which is sensitive to X-rays. This cassette also must be loaded and unloaded with the foil, and at least the unloading for treatment of the foil is necessary. A process for the utilization of such a cassette is also known from the European document EP 0132709 A2 as well as from the devices which are on the market. Such processing devices for such cassettes with a phosphorus-coated receiving film are based on the fact that during the exposure of the film located in the cassette with X-rays, a latent image is formed. After removing the film from the cassette, in a reading station by means of a laser scanner, the latent image is brought to luminescence (the phosphorus is stimulated) and the thusly emitted light is converted into digital electrical image signals. These signals can be converted further on an image screen, or in an image screen receiving device, or in a computer-controlled laser receiving device into a visible image. Then the residual image is erased and the film is supplied to a cassette loading device. The identification data on the identification means of the film should be readout by a suitable reading device and converted into digital electric identification signals and added to the aforementioned digital image signals.

The disadvantage of the known method is that the film between being removed from the cassette in the reading station and being reinserted into the cassette in the cassette loading device must travel a considerable path with no protection against mechanical influence, so that the phosphorus layer can be subject to a premature wear. Also, for the processing of the cassettes or films, the cassettes must be individually inserted into the reading station and individually withdrawn from it.

SUMMARY OF THE INVENTION

Accordingly, it is an object of the present invention to provide a processing or treating (handling) device which avoids the disadvantages of the prior art.

More particularly, it is an object of the present invention to provide a device in which with simple means a stacking of cassettes to be processed before and after a respective device and their successively performed automatic insertion into the device is possible.

It is also an object of the present invention to achieve the above goal and at the same time to make possible the utilization of the device as a conventional cassette loading and unloading device, or as a reading station for phosphorus-coated films.

In keeping with these objects and with others which will become apparent hereinafter, one feature of the present invention resides, briefly stated, in a handling device for X-ray film cassettes with a sheet shaped receiving material sensitive to X-rays comprises means forming an input slot for introducing a cassette, means forming a separate output slot for removing a cassette, the input and output slots extending substantially in the vertical direction, a cassette input stack container for accommodating cassettes to be inserted into the input slot and associated with the latter, and a cassette output stack container for receiving cassettes withdrawn from the output slot and associated with the latter, the input stack container having a bottom surface which extends downwardly towards the input slot and a rearwardly inclined rear wall which borders and aligns with the input slot, the input stack container being provided with transporting means for a first cassette accommodated in a cassette stack and having its end side aligned with the input slot, the output stack container also having a rearwardly inclined rear wall and a downwardly forwardly inclined bottom surface provided with a catching railing for the cassettes.

When the device is designed in accordance with the present invention it is possible to keep cassettes to be handled in a simple loose fashion in the inlet stack container. After the handling, the cassettes can be automatically loosely placed in the outlet stack container. A conventional cassette can be unloaded in the device and a new film of a conventional type can be loaded again. First of all the invention is provided for a reading or evaluating device for phosphorus-coated foils. It is especially useable when the erased phosphorus foil is again inserted in the same cassette introduced in the evaluating device and thereby the cassette which is again ready-to-use is withdrawn from the device and stacked in the outlet stack container. The device formed in accordance with this feature provides additionally the possibility to place the cassettes to be handled as a stack before the device and return again back as a stack, which provides for the following advantages:

The user has nothing to do with the film; he does not see the film with the exception of film exchange which is required after a very long use. A special cassette loading process together with the cassette loading device are dispensed with. The device operates actually always with a cassette which is filled with the film. By the return of the film always the same cassette in the reading station, the cassette must cover an extremely short path, and therefore it is protected against damages during transportation or against wear than in the known processing devices for cassettes for phosphorus-coated films. This approach can also be used with advantage when the patient's data are not stored in a memory on the cassette, but added in a different manner to the digitalized image signals, for example through a readable memory on the film or through the data signals directly added to the image signals via a keyboard on the reading station.

In the device the transporting means of said input stack container is arranged on the rear wall of the input stack container, in accordance with the invention.

In the inventive device the transporting means of the input stack container is arranged on the bottom surface of the input stack container.

In accordance with another feature of the present invention each of the bottom surfaces and each of the rear walls are arranged so that each of the bottom surfaces is inclined relative to a horizontal plane by an angle which is greater than an angle of inclination of each of the rear walls relative to a vertical plane of a respective one of the stack containers.

In accordance with still another feature of the present invention the rear walls of the stack container are arranged at an angle relative to one another, and further comprising further cassette transporting means arranged before the output slot, and at least two structural groups of cassette transporting- and guiding means provided between the input slot and the transporting means associated therewith on the one hand, and the output slot on the other hand, and supported turnably so that the cassette transporting- and guiding means of a first one of the structural groups can be aligned either with the input slot or with the cassette transporting- and guiding means of a second of the structural groups, and the cassette transporting- and guiding means of the second structural group can be aligned either with the cassette transporting- and guiding means of the first structural group, or with the output slot, or with the further cassette transporting means, so that a cassette can be transported by means of the structural groups from the input slot to the output slot.

The afore-mentioned two structural groups of cassette transporting and guiding means can be formed as identical structural groups having identical elements.

Still a further feature of the present invention is that a manipulating unit located under each of the structural groups, for cassette positioning, opening, loading and unloading and closing means and arranged so that a cassette can be placed on one of the manipulating units and moved back from the other of the manipulating units to a respective one of the structural groups.

It is possible that the cassette transporting- and guiding means of each of the structural groups has a downwardly and upwardly turnable guiding skid.

In the aforesaid construction each of the guiding skids has at least two lifting prongs spaced from one another by a distance which is smaller than a shortest length of a cassette coming in direction of the guiding skid so as to engage a cassette.

In accordance with the present invention, means forming a further input slot provided for an individual cassette and arranged on an extension of one of the groups which is associated with the input slot in its position in which it aligns with the other of the structural groups.

In accordance with a further feature of the present invention the structural groups have opposite ends and are turnably supported on the opposite ends, and further there is means for selectively turning the structural groups. The means for selectively turning include two oppositely running motors with respective transmission, connected with the structural groups and performing the turning of the structural groups, respectively.

Another inventive feature of the invention is common support and two toothed curved pieces fixedly arranged on the common support and provided between the structural groups for cooperating therewith.

It is a further feature of the present invention that a flat film platform is arranged under the manipulating unit so that a film from the structural units which is associated with the inlet slot can be introduced in the platform and returned in the same cassettes transported in the manipulating unit associated with the outlet slot.

Still another feature of the present invention is that with a reading station and an erasing station, the flat film platform is movable between the manipulating units and the structural groups so that it passes the reading station and the erasing station. The reading station includes a laser scanner and a light conductive element with a photomultiplier; and further comprising a central memory connected with the photomultiplier.

Finally, in accordance with an additional feature of the present invention the inlet stack container is provided with a proximity switch which is arranged to cooperate with a metal label provided on a cassette near its corner so that when the proximity switch does not produce a signal the cassette is not pulled into the cassette inlet slot. The proximity switch is arranged in the bottom surface of the inlet stack container. The inlet slot and the outlet slot are formed as light-tightly closeable slots.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a combination of the present invention with an inventive processing or treating or evaluating device with stack containers for X-ray receiving cassettes;

FIG. 2 is a perspective view of the inventive device with stack containers or the cassettes;

FIG. 3 is a view showing a section of an inlet stack container of FIG. 2, taken along the line III—III;

FIG. 4 is a view showing a section of an outlet stack container of FIG. 2, taken along the line IV—IV;

FIG. 5 is a view which schematically shows structural groups served for cassette transportation in the device of FIG. 2;

DESCRIPTION OF THE PREFERRED EMBODIMENTS

Figure 6:
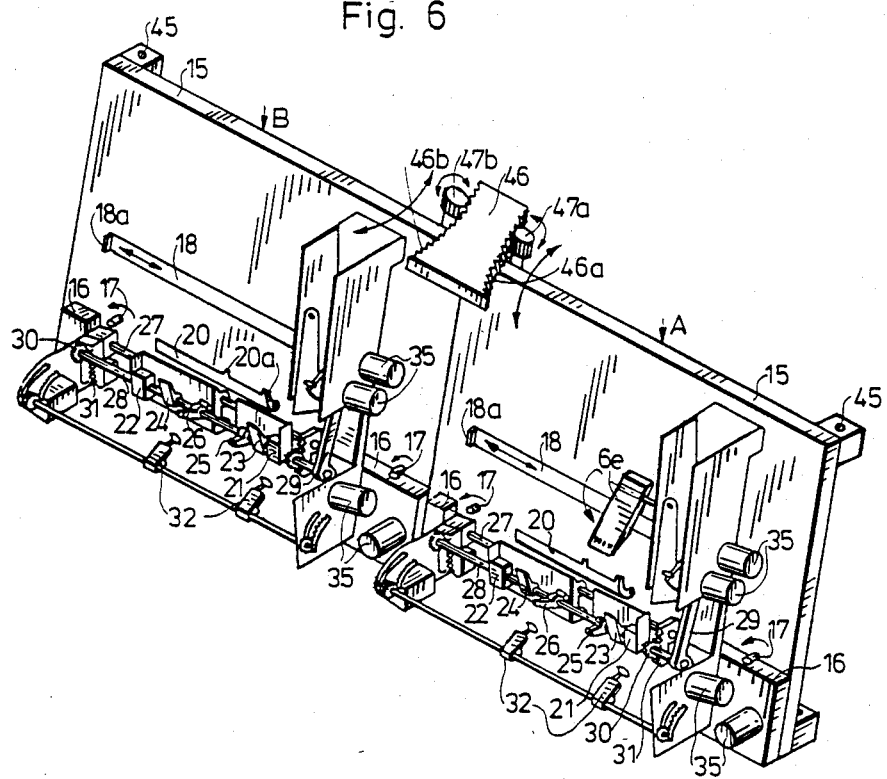
FIG. 6 is a perspective view showing a possible cassette manipulating device of FIG. 2.

The present invention is suitable for a known cassette for accommodating X-ray sensitive photographic materials. Such cassettes are comprised of two housing portions pivotable relative to each other. One of such portions is a bottom part and another is a lid, whereby normally the bottom part faces a patient or X-rays. The present means for the photographic material, for example a foam plate is accommodated in the cassette. The cassettes being processed are identified in the drawing by reference numeral 1 and are shown only schematically. The cassettes 1 of substantially the same suitable type with elements 1a for locking and unlocking the lid are available in different sizes and formats. Instead of usual photographic X-ray film, the cassette 1 can accommodate a receiving film or foil 2 which is coated with a stimulatable phosphorus layer. When this film with the phosphorus layer is subjected to X-rays a latent image is produced which, by scanning with a laser beam is stimulated and converted into digital electric image signals which are stored. The stored image signals can then be observed as a visible image on an image screen. Also a so-called hard copy on the usual photographic film can be produced by the known method.

On the external surface of the lid of each cassette 1, in a determined position relative to a reference point, which is the same for all cassettes of the same type but different formats, is positioned a data storing, recording reading and erasing memory 3 which processes said data in digital form and is attached to the lid. For distinguishing from other memories this memory will be identified as a cassette memory. Only a carrier plate and terminals are visible on the cassette memory 3. As a reference point for the position of the cassette memory 3 a predetermined cassette corner can be utilized, which is positioned at the same position in the respective apparatus for cassettes of all formats.

The utilization of the cassette 1 of the above mentioned type with phosphorus-coated foil 2 and a recording, reading and at least partially erasing memory 3 requires a specific foil-fining and work-saving process of handling. The basic principle of handling phosphorus-coated films 2 is that during the exposure of the film 2 with X-rays in an X-ray apparatus 5 a latent image is produced, which is stimulated in a reading or evaluating station 6 after the removal of the film 2 from the cassette, by means of a laser beam scanner 6a by a rotating mirror 6b, preferably upon further movement of the film 2. The light which is emitted in this process is converted via a fibrous optic and a photomultiplier 6c into digital electrical image signals, and then the remaining image on the foil 2 is erased by exposure to visible light by means of a lamp 6d. The digital image signals are stored in a central memory 7 and can be converted again into a visible image on an image screen 8 or in an image screen receiving apparatus or in a laser beam receiving apparatus (both devices are known as hard-copy devices), on a photographic sheet material in form of a visible image. These signals can also be stored on a disc 10 or similar equipment.

A utilization of a cassette 1, 2, 3 resides in that in an identification station 4 provided with an operation keyboard 4a, the data are stored from a cassette memory 3 which stores image specific data, for example, patients' data, and is immediately before or after the X-ray reception (photographing) in the X-ray apparatus 5, the stored data of memory 3 are read out in the reading station 6 and are stored, together with the digital image signals obtained from the film 2 exposed to X-rays, in the central memory 7 and are photographed together with a respective image visible on the screen 8 or in the hard-copy apparatus 9. The erasing of the specific image data from the cassette memory 3 after their evaluation in the reading station 6 can be executed either in a reading arrangement 6e for the cassette memory 3 in the reading station 6, or when new data are input in memory 3 in the identification station 4. These method versions depend upon the devices utilized.

For processing or handling the cassettes 1 which carry the films 2 with the memories 3, the cassette 1 provided with stored specific input data is inserted into the reading station 6 as shown with the arrow, through an insertion slot 6f or 6h (see FIGS. 1, 2, 7-9). The cassette 1 is positioned in the reading station. The specific image data are read out from the memory 3 by a reading arrangement 6e shown in FIG. 6. Then the cassette 1 is opened and film 2, after the aforedescribed conversion of its latent image into digital image signals and storing of these signals and the data from the memory 3 in the central memory 7 and erasing the image from the film 2, is again transported into the same cassette 1 from which this film was removed. Then a reloaded cassette is removed from an outlet slot 6g ready to use.

As can be seen from FIGS. 5-9, the cassette 1 inserted into the reading station 6 is transported substantially linearly through the reading station 6. At the first location, the cassette is supported and lowered so that it is gripped by a known positioning and unloading device, opened, unloaded and closed. Then the cassette is lifted to its previous level on the transporting track and is displaced to a second location or position in which the cassette is again handled by the second positioning and loading device similarly to the aforementioned one. In this second positioning and loading device, the cassette 1 is again positioned, opened and reloaded with a processed film 2, as described above, then closed and discharged for reuse through the outlet slot 6g from the reading station 6. The film 3 removed from the cassette 1 in the first positioning and unloading device is inserted in the known fashion into a conventional flat film platform 33 and is moved in this platform linearly and parallel to the cassette 1 through its processing station and then is inserted into the cassette 1 in the second positioning and loading station. The film 2 outside of the cassette is moved back only over a very short path parallel to the cassette movement, whereby a separate delivery of the cassette and the film in the loading apparatus is omitted, and the film can be saved from abrasion. In addition the time on loading can be saved and a specific loading apparatus can be dispensed with.

The positioning of the cassette for reading-out its memory 3 and for the removal of the exposed film and reinsertion of the same into the cassette on the reading station 6 can be executed by known cassette loading and unloading devices disclosed for example in the German document DE 3,544,719 C1. Two such devices which are similar to each other and serve to position, load and unload the cassette received in the reading station 6 are schematically shown in FIG. 6. Each of these devices includes a supporting and guiding plate 15 each positioned laterally behind the respective inlet slot 6f of the reading station 6. In alignment with the lower edge of the vertical inlet slot 6f are positioning guiding tracks for the cassette 1. Each guiding track 16 is provided with at least one driven friction roller 17. If the cassette is inserted into the reading station through the inlet slot 6f and moved up to the friction rollers 17, this roller grips the cassette and moves the same to the transporting belt 18 with gripper 18a. The cassette is moved to the first positioning device 8. Then, the cassette is transported to pivotable guiding skits 20 in the region of the positioning means. The latter are comprised of an abutment angle 21 which is stationary and an abutment angle 22 which is movable and is aligned with the abutment angle 21. Rotatable and movable locking or holding bars 22, 24 for unlocking the cassette lid by teeth provided on the lower faces thereof and rotatable levers 25, 26 for closing the cassette lid are positioned between the abutment angle 21 and 22 (FIG. 6). The abutment angle 22 along with locking bar 24 and levers 26 assigned thereto is displaceable on a rod 27, and, together with the locking bar 23 and the lever 24 is supported on a shaft 28, which is rotated by a crank drive 29 rigidly connected to the shaft 28 and, by gears 30 rigidly connected with the crank drive 29 and meshing with a toothed rack 31, is displaced up and down. Upon the insertion of the cassette into the reading station 6, the shaft 28 is in its upper position in which the abutment angles 21, 22 not rotated by the shaft 28 lie approximately in or below the plane of the track 16 or the guiding skit 20. The cassette is also moved by the guiding skit 20 from the plane of the track 16 to the region of the abutment angle 21, 22. Then the movable angle 22 is displaced relative to the stationary angle 21 so that the cassette is positioned between these angles. Now, the reading arrangement 6e which lies against the cassette lid is pivoted in front of the cassette memory 3 to read-out the data stored therein and transmits those data to the central memory 7 as described above. The reading arrangement 6e thereafter is pivoted away from memory 1. The crank 29 now rotates the shaft 28 in the counterclockwise direction. At this point, the cassette, the bars 23, 24 and the levers 25, 26 are moved downwardly and at the same time the locking bars 23, 24 and the levers 25, 26 are rotated and also displaced so that the cassette locking means 1a are unlocked, the cassette lid springs out from the bottom of the cassette either under the action of the cassette spring or is pulled from the bottom of the cassette by a non-shown opening hook pivotably supported on the crank 29. The film 2 is sucked out from the cassette 1 by a known suckers 32 and is inserted into the conventional film platform 33, for example by vacuum means, and further transported to the laser beam scanner 6a. After the erasing of the film 2, it is transported to the region of the suckers 32 of the second positioning device for the cassette 1 and is inserted back into the cassette. The cassette has been already moved to this point by two transporting belts 18 connected to each other, after it has been closed in the first positioning device A and lifted by the first guiding skid 10 to the plane of the track 16. When the cassette 1 has reached the second positioning device B, it is again supported and inserted by the second guiding skid 20 into the second positioning device, positioned there and opened. Now, the crank 29 rotates in the opposite direction. The cassette 1 and the shaft 28 are moved upwards, the levers 25 and 26 grip the cassette lid and push it to close. The re-loaded and closed cassette is pivoted upwardly by the guiding skid 20 onto the plane of the tracks 16.

The movement of the platform 33 can be executed by such known means as a motor-driven worm 34 or a belt drive. The swinging motion of the reading device 6e toward the cassette memory 3 in the first positioning device (FIG. 6) is carried out by a motor drive. Both guiding skids 20 are driven by a motor in a not-shown fashion. Each guiding skid 20 includes two prongs 20a which engage the lower narrower side of the cassette and hold it during pivoting downwardly into the positioning device up to the final transfer and become again disengaged from the cassette. Individual drive motors 35 for the positioning devices A, B are schematically shown in FIG. 6.

As can be seen from the drawings, the inlet slot 6f is only an auxiliary inlet slot in which a special cassette to be immediately processed is inserted by hand when there is an alignment of two identical structural groups A and B composed of the cassette transporting means and guiding tracks 16–18 and positioning, opening, loading or unloading and closing devices, or the cassette manipulating device 21–32, with the auxiliary insert slot 6f. For the normal use the front side of the reading device 6 is provided with an inlet slot 6h and an outlet slot 6g which are somewhat rearwardly offset. They are located opposite to one another and inclined to the front side in the interior of the device and extend substantially vertically. A stack container 40, 41 is arranged before each slot 6h, 6g, for example in the housing of the device. The stack container 40 is a cassette inlet stack container, while the stack container 41 is the cassette outlet container.

For insuring the insertion of the cassette in the proper position the small side of the cassette which lies on a guiding surface 40a can be provided with a metal label 1c near the corner 1b. The metal label cooperates with a proximity switch 40c located in the guiding surface 40a so that when the switch does not produce a signal the pulling-in of the cassette is interrupted.

Figure 8:
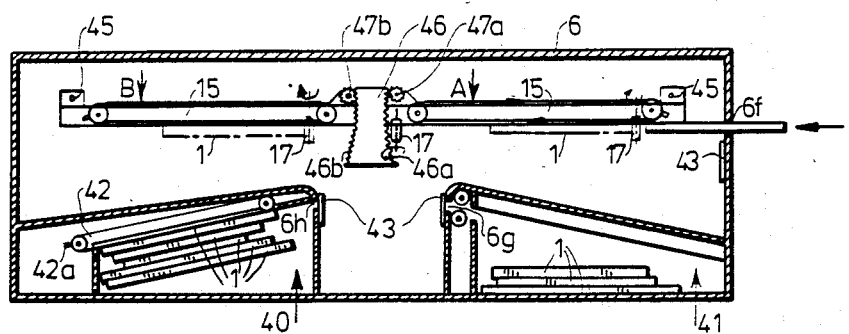
FIGS. 7, 8 and 9 are views schematically showing the positions of the structural groups of FIGS. 5 and 6 relative to the slots for the cassettes or the stack containers in different phases of the cassette transportation through the device of FIG. 2.
Figure 7:
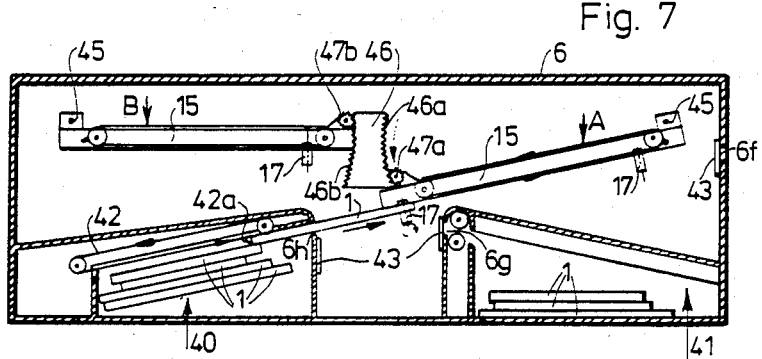
Figure 9:
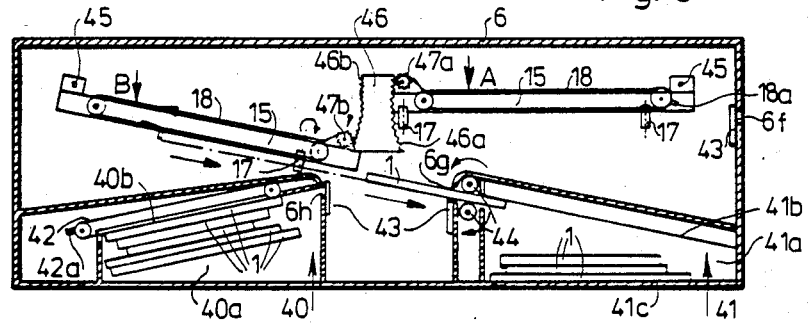

The inlet stack container 40 has a bottom surface 40a which extends upwardly to the insertion slot 6h, and a rear wall 40b which is arranged on the bottom surface 40a so that it borders the inner slot 6h and is in alignment with it. The rear wall 40b is rearwardly inclined. Transporting means for the cassette are arranged on the rear wall 40b. The transporting means can include a transport band 42 which is similar to the transport hand 18 and provided with at least one gripper 42a. It is, however, also possible to provide respective transport roller which correspond to the rollers 17, on the bottom surface 40a directly before the rear wall 40b. The outlet stack container 41 also has a slightly rearwardly inclined rear wall 41b in the extension of the outlet slot 6g, and forwardly downwardly inclined bottom surface 41a connected with the rear wall 41b. A catching railing 41c for the cassettes 1 is arranged in front of the bottom surface 41a. The angle of inclination of both bottom surfaces 40a, 41a relative to the horizontal plane is somewhat greater than the angle of inclination of the rear walls 40b, 41b relative to the vertical plane. The rear wall 40b, 41b are moreover inclined relative to front side of the device to the slot 6h or 6g, as can be seen in FIGS. 7–9. The slots 6f–6h are light-tightly closeable by sliders or louvers 43 and advantageously controlled automatically from the cassette loading and unloading devices in a known manner, so that they are always closed when a cassette is located in the device.

The cassettes 1 which are to be processed in the reading device 6 are now simply placed in the inlet stack container 4, as they were illuminated, and slide on the inclined bottom surface 40a rearwardly. The respective lowermost cassette abuts against the rear wall 40b. When one cassette is withdrawn from the device 6, the drive for the transport band 42 is turned on, the slider 43 of the inlet slot 6h is opened, and the rearmost or the lowermost cassette 1 is automatically transported into the slot 6h. The remaining cassettes of the inlet stack slide automatically rearwardly, and the lowermost cassette is again brought to abutment against the rear wall 40b.

The cassette 1 which is transported inclinedly and rearwardly through the slot 6h cannot be inserted into the structural group A for the purpose of its emptying when this structural group A assumes the position shown in FIGS. 5, 6 and 8. The two structural groups A and B between the inlet slots 6h and the outlet slots 6g are so supported turnably relative to open another that the guiding means 15, 16, 20 of the first structural group A can align either with the inlet slot 6h or with the guiding means 15, 16, 20 of the other structural group B, and the guiding means of the other structural group B, can align either with the guiding means of the first structural group A, or with the output slot 6g, or with the transporting means which are arranged in the device 6 prior to the outlet slot 6g, for example transport roller pair 44 for the cassettes. For this purpose, both structural groups A and B are supported at their opposite ends rotatably about axes 45. For selective or operationally-correct turning of both structural groups A and B, two oppositely running toothed curved pieces 46a, and 46b are provided on a fixed carrier piece 46, and a driveable toothed wheel 47a or 47b connected with the respective structural group A or B engages each toothed curved piece.

At least simultaneously with, but preferably somewhat before the start of running the transport band 42 for transporting a new cassette from the input stack through the input slot 6h, the toothed wheel 47a is driven from the position of FIG. 8 and turns the whole structural group A forwardly to the position of FIG. 7, in which the cassette guiding and transporting means of the structural group A align with the input stacker container 40. The new cassette is displaced from the transport band 42 and transport means 17 onto the guiding means 15, 16 and 20 of the structural group A and from there brought to the position (FIG. 6) in which it is insertable in the manipulating device 21-32. Then, by means of the drive of the toothed wheel 47a, the structural group A is turned back to the position of FIG. 8. In this position a transfer of the cassette to the manipulating device 21-32 is performed (FIG. 6), and the removal of the foil 2 and the transfer to the flat film platform 33 and the reading of the foil 2 take place (FIG. 5). The cassette is then again closed and lifted back to the guiding path 16, 20. Then, the empty cassette is transported further through the transport means 17, 18 of both structural groups A, B to the structural group B and again assumes the position in which it is insertable into the manipulating device 21-32 of the structural group B. The cassette is again positioned in the manipulating device 21-32 of the structural group B, opened, loaded with the properly arrived, read-out and erased film 2 by means of the sucker 32, again closed, and displaced back to the guiding path 16 of the second structural group B. Now the toothed wheel 47b of the second structural group B is driven and turns the structural group B forwardly in accordance with FIG. 9 so that the guiding means 16, 20 substantially align with the output slots 6g or the rear wall 41b of the output stack container 41. By means of the cassette transporting means 17, 18 and in some cases the transporting rollers 44, be finally read out and ready for operation of cassette 1 is displaced to the output stack container 41. In the output stack container 41 it slides forwardly because of the inclination of the bottom surface 41a, onto the cassettes which are already stacked on the railing 41c. The structural group B is subsequently turned to the position of FIG. 8 and the above described cycle of the automatic cassette processing from one stack to the other stack starts again. Light barriers or proximity switches and the like are advantageously arranged in the inlet stack container 40, and connected with a known control device for automatically controlling the whole process of the presence of the cassettes in the input stack container 40.

For the sake of simplicity only one example is shown in the drawings. The shown stack containers 40, 41 as well as the structural groups A, B with guiding, transporting and cassette manipulating devices 13-32 can also be used in cassette loading and unloading devices of a conventional type. The films withdrawn in the structural group A must be supplied to a developing device, and in the structural group B a film of a respective format must be supplied from film supply magazines into the cassette. Also, the mechanical guidance of the cassettes for the foils or films in the device 6 can be performed in a different way, such as for example for the originals and sheets guidance in copying devices. The shown exemplary form illustrates, however, an especially simple and compact unit.

It will be understood that each of the elements described above, or two or more together, may also find a useful application in other types of constructions differing from the types described above.

While the invention has been illustrated and described as embodied in a handling device for X-ray film cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to the protected by Letters Patent is set forth in the appended claims.

1. A handling device for X-ray film cassettes with a sheet shaped receiving material sensitive to X-rays, comprising means forming an input slot for introducing a cassette; means forming a separate output slot for removing a cassette, said input and output slots extending substantially in the vertical direction; a cassette input stack container for accommodating cassettes to be inserted into said input slot and associated with the latter; and a cassette output stack container for receiving cassettes withdrawn from said output slot and associated with the latter, said input stack container having a bottom surface which extends downwardly towards said input slot and a rearwardly inclined rear wall which borders and aligns with said input slot, said input stack container being provided with transporting means for a first cassette accommodated in a cassette stack and having its end side aligned with said input slot, said output stack container also having a rearwardly inclined rear wall and a downwardly forwardly inclined bottom surface provided with a catching railing for the cassettes.

2. A handling device as defined in claim 1, wherein said transporting means of said input stack container is arranged on said rear wall of said input stack container.

3. A handling device as defined in claim 1, wherein said transporting means of said input stack container is arranged on said bottom surface of said input stack container.

4. A handling device as defined in claim 1, wherein each of said bottom surfaces and each of said rear walls are arranged so that each of said bottom surfaces is inclined relative to a horizontal plane by an angle which is greater than an angle of inclination of each of said rear walls relative to a vertical plane of a respective one of said stack containers.

5. A handling device as defined in claim 1, wherein said rear walls of said stack containers are arranged at an angle relative to one another; and further comprising further cassette transporting means arranged before said output slot; and at least two structural groups of cassette transporting- and guiding means provided between said input slot and said transporting means associated therewith on the one hand, and said output slot on the other hand, and supported turnably so that said cassette transporting- and guiding means of a first one of said structural groups can be aligned with said input slot or with said cassette transporting- and guiding means of a second of said structural groups, and the cassette transporting- and guiding means of said second structural group can be aligned either with said cassette transporting- and guiding means of said first structural group, or with said output slot, or with said further cassette transporting means, so that a cassette can be transported by means of said structural groups from said input slot to said output slot.

6. A handling device as defined in claim 5, wherein said structural groups are formed as identical structural groups.

7. A handling device as defined in claim 5; and further comprising a manipulating unit located under each of said structural groups provides for cassette positioning, opening, loading and unloading and closing means and arranged so that a cassette can be placed on one of said manipulating units and moved back from the other of said manipulating units to a respective one of said structural groups.

8. A handling device as defined in claim 7; and further comprising a flat film platform arranged under said manipulating unit so that a film from said structural units which is associated with said inlet slot can be introduced in said platform and returned in the same cassettes transported in the manipulating unit associated with said outlet slot.

9. A handling device as defined in claim 8; and further comprising a reading station and an erasing station, said flat film platform being movable between said manipulating units and said structural groups so that it passes said reading station and said erasing station.

10. A handling device as defined in claim 9, wherein said reading station includes a laser scanner and a light conductive element with a photomultiplier; and further comprising a central memory connected with said photomultiplier.

11. A handling device as defined in claim 5, wherein said cassette transporting- and guiding means of each of said structural groups has a downwardly and upwardly turnable guiding skid.

12. A handling device as defined in claim 11, wherein each of said guiding skids has at least two lifting prongs spaced from one another by a distance which is smaller than a shortest length of a cassette coming in direction of said guiding skid so as to engage a cassette.

13. A handling device as defined in claim 5; and further comprising means forming a further input slot provided for an individual cassette and arranged on an extension of one of said groups which is associated with said input slot in its position in which it aligns with the other of said structural groups.

14. A handling device as defined in claim 5, wherein said structural groups have opposite ends and are turnably supported on said opposite ends; and further comprising means for selectively turning said structural groups.

15. A handling device as defined in claim 14, wherein said means for selectively turning include two oppositely running motors with respective transmission, connected with said structural groups and performing the turning of said structural groups, respectively.

16. A handling device as defined in claim 5; and further comprising a common support and two toothed curved pieces fixedly arranged on said common support and provided between said structural groups for cooperating therewith.

17. A handling device as defined in claim 1, wherein said inlet stack container is provided with a proximity switch which is arranged to cooperate with a metal label provided on a cassette near its corner so that when said proximity switch does not produce a signal the cassette is not pulled into the cassette inlet slot.

18. A handling device as defined in claim 17, wherein said proximity switch is arranged in said bottom surface of said inlet stack container.

19. A handling device as defined in claim 1, wherein said inlet slot and said outlet slot are formed as light-tightly closeable slots.

* * * * *